United States Patent

[11] 3,574,946

[72] Inventors Donald Mayston
Potters Bar;
John H. Elworthy, Abbotts Langley,
England

[21] Appl. No. 506
[22] Filed Jan. 5, 1970
[45] Patented Apr. 13, 1971
[73] Assignee Protocol Engineering Limited
Hartfordshire, England
[32] Priority Nov. 27, 1964, Mar. 9, 1965
[33] Great Britain
[31] 48406/64 and 9985/65
Continuation of application Ser. No. 731,682, May 17, 1968, now abandoned, which is a continuation of application Ser. No. 509,857, Nov. 26, 1965, now abandoned.

[54] GRAPHIC REPRODUCTION PROCESSES
10 Claims, 7 Drawing Figs.

[52] U.S. Cl. .......... 33/184.5, 77/69
[51] Int. Cl. .......... B41b 1/00
[50] Field of Search .......... 33/184.5, 125 (T); 77/69, (Inquired), 855, 101

[56] References Cited

UNITED STATES PATENTS

| | | | |
|---|---|---|---|
| 1,451,610 | 4/1923 | Gestas .......... | 77/69 |
| 2,734,577 | 2/1956 | Spiller et al. .......... | 77/69X |
| 2,871,572 | 2/1959 | Gutzmer .......... | 33/184.5 |
| 2,995,826 | 8/1961 | Brault .......... | 33/125(T)X |

*Primary Examiner*—William D. Martin, Jr
*Attorney*—Halcombe, Wetherill & Brisebois

ABSTRACT: The present invention relates to graphic or like reproduction processes and is concerned with obtaining accurate registration between the number of sets of color components, particularly color separation components, with respect to a carrier sheet. In accordance with the invention and where there is a number of sets of color separation components, the components of each set are initially registered with respect to the carrier sheet and then two spaced registration holes are formed through each set of components and the carrier sheet in the same relative positions, whereupon the plurality of sets of components and the carrier sheet can be positioned in register by locating the now formed register holes over suitable register pins. The invention also relates to apparatus for carrying out this method and comprising a surface to receive the color components and the carrier sheet with means for holding the relative materials in proper relation to said surface: a drilling machine is also provided for making the register holes in the materials simultaneously, said machine being mounted so as to be capable of movement in 2° above the surface.

Patented April 13, 1971 3,574,946

3 Sheets-Sheet 1

*Inventors*
D. MAYSTON
J. H. ELWORTHY
*By* Holcombe, Wetherill & Brisebois
*Attorneys*

Patented April 13, 1971 3,574,946

3 Sheets-Sheet 2

Inventors
D. MAYSTON
J. H. ELWORTHY
By
Holcombe, Wetherill & Brisebois
Attorneys Patented April 13, 1971 3,574,946

3 Sheets-Sheet 3

Inventors
D. MAYSTON
J. H. ELWORTHY
By
Holcombe, Wetherill & Brisebois
Attorneys

GRAPHIC REPRODUCTION PROCESSES

This application is a Streamline Continuation of Ser. No. 731,682, filed May 17, 1968 now abandoned, which was a Streamline Continuation of Ser. No. 509,857, filed Nov. 26, 1965 also now abandoned. The present invention relates to graphic or like reproduction processes, particularly to color printing and more particularly to a method of simplifying the procedure to obtain registration of individual sets of color separation component records where a plurality of different sets of such records are to appear throughout the areas of a plurality of carrier sheets, one for each group of separation components representative of one color.

In multicolor printing, registration of the set of records where a single illustration is to appear on the same final record carrier presents no special problems since it is only a question of matching the relative positions of the various records into a single set. However, where many separate illustrations are to appear on the same record carrier, serious problems arise because once the images have been printed down upon the printing plates no adjustment is possible and consequently the records or images must be registered at a stage prior to the making of the plate. For a single multicolor picture, the provision of a set of separation components of the same size in exact relationship to one another is not difficult and this is normally achieved by registering the individual color separation component records, generally made on films, on register pins provided in the camera, or in apparatus embodying means for electronically scanning the record, these pins being located in punched holes in a margin of the film. The spacing of the register pins and of the punched holes follows a standard pattern and dimensions and, assuming that the camera or other apparatus is not moved between subsequent exposures made through appropriate differently colored filters for each component, two or more matched color separation negatives or positives may be produced.

After any necessary artwork the next stage is the preparation of a flat for each of the various records suitably disposed therein. A "flat" is the term used for a transparent sheet to which the record is secured.

However, in the case where a plurality of different sets of component records is required to be made from a plurality of groups of color separation components, this has hitherto been effected by firstly preparing a layout or other key on a suitable material, this layout being drawn to show the dispositions of the various illustrations as they will appear on a sheet or a continuous web. A sheet of transparent film is then placed over this layout or key and a first group of component records is placed carefully in position and secured to the transparent film, e.g. by an adhesive or by adhesive tape to make a flat.

The second and subsequent groups of component records are then produced, each set on its own flat which is overlayed on the first, with the second and subsequent group of component records in exact alignment with the first. Either the image itself is used as a guide or register marks are made in the margins for the same purpose. This is a long and tedious job for the operator because even small errors, e.g. of the order of 0.002 inch are visible in the finished product.

It is an object of the invention to enable accurate alignment to be effected by relatively unskilled operators in a fraction of the time taken by the conventional methods.

In the art of graphic reproduction processes, particularly color printing therefore, the invention consists in a method for effecting the registration of at least one set of color separation or other components with respect to at least one carrier sheet, which method comprises initially registering the components of each set with respect to said at least one carrier sheet by forming at least two spaced registration holes through said at least one set of components and said at least one carrier sheet in the same relative positions, and positioning the at least one set and the at least one carrier sheet in register one with the other by locating said register holes over register pins.

The holes are preferably formed by drilling, although any suitable method of forming the holes may be used.

Furthermore it is generally preferable to position each set of color separation or other components on the one or more carrier sheets before each registration hole is formed therethrough at the same time, although if a jig such as a bush plate is employed, which is provided with holes corresponding to the registration holes to be formed in the or each set of components and the carrier sheet or sheets, it is possible to locate the jig to form the holes in the or each set of components and then locate the jig to form the holes in the one or more carrier sheets and still to obtain satisfactory registration when the set or sets of components are positioned on the carrier sheet or sheets.

By means of the method according to the present invention it is no longer essential to employ transparent carrier sheets for mounting the color separation or other components or indeed to provide a separate carrier sheet for each component since it is possible to use a single sheet for successively registering the different color components of a set with respect to the sheet or sets and to transfer the information represented by any one color or other component onto a printing plate or the like before registering the next component with the sheet.

In order that the invention may be more clearly understood reference will now be made to the accompanying drawings which show one embodiment of a method according thereto and in which.

Figure 1:
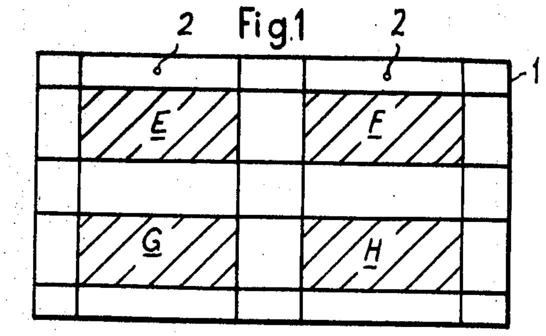
FIG. 1 shows a layout sheet.

Referring to the drawings, a layout sheet 1 is punched by any appropriate punch or otherwise pierced with holes as shown at 2. Holes of the same size and spacing are also punched in transparent carrier sheets, and later on the litho or other printing plate itself and this puts the holes in a constant relationship to the upper edge and one side of all the sheets. Thus if the color component records are registered to the plate by means of these pin holes and if the printing roller or drum is fitted with similar pins the layout may be prepared to put the record in any desirable position on the final record carrier.

Figure 2:
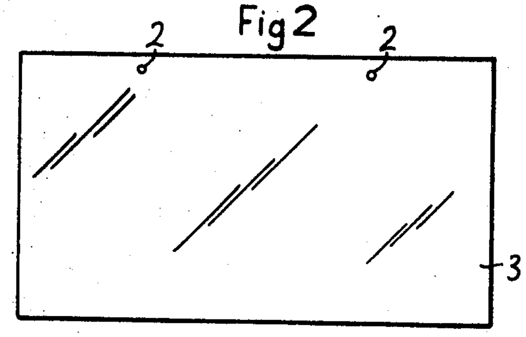
FIG. 2 shows one sheet of a record carrier material, e.g. transparent film.
Figure 3:
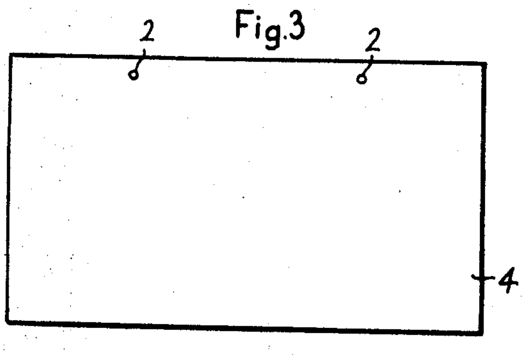
FIG. 3 shows a backing sheet, normally mounted on a registering machine.

Firstly, the layout 1 is punched with the holes 2 and ruled up to indicate the positions of the various sets of records. In FIG. 1 only four such positions are shown at E, F, G and H, corresponding to the appearance of four pictures on the same final record carrier but it will be understood that any number of positions may be provided. If the normal four-color print is finally required then, in one method of operation, four separate carrier sheets of transparent film 3 as shown in FIG. 2 are also punched with holes in the same relative positions. For this reason these holes have also been given the reference numeral 2. A backing sheet, which may be of fiberboard or other rigid opaque material 4 is also provided which is pierced with holes corresponding to the holes 2, but this backing sheet may be transparent if the assembly is made over a light table.

A table or board T is used which has location pins P near one edge preferably with means e.g. clamping bars, for clamping the various record carrier sheets in position.

The backing sheet 4 is placed on the table and located over the pins and thereon are located the four transparent sheets followed by the layout 1 which are clamped together in any suitable fashion.

Figure 4:
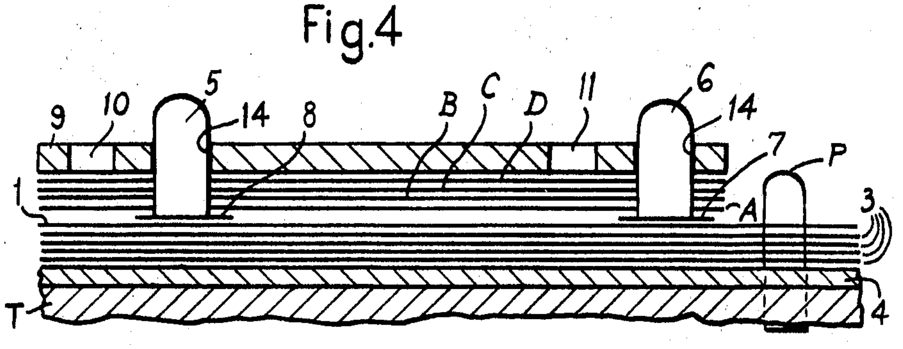
FIG. 4 shows how a set of component records is mounted on temporary location pins, and applied over the record carrier sheets, layout and backing sheet.

As shown in FIG. 4 a first set of four records indicated at A, B, C and D which may be films, glass plates or printing plates and provided with register holes 14, are placed upon suitable location pins such as headed location pins 5 and 6 which are laid down upon the table with their heads 7 and 8 lowermost. Over these records A, B, C and D and locating closely upon the pins 5 and 6 is laid a metal bush plate 9 having holes therein to register with said pins but, in addition, further holes 10 and 11 for a purpose which will be specified later. Although only two holes 10 and 11 are referred to, a larger number may be provided if desired. With the bush plate 9 in position the complete set of records will be in exact alignment one with the other. Alternatively the pins may be mounted on a thin metal strip and the bush plate dispensed with.

The aligned set of records is then moved into its appropriate position on the layout 1, say in the area E, and is held in any suitable manner e.g. by clamping, over the previously located set of four transparent sheets, mounted on the backing sheet 4 and covered by the layout 1, the latter assembly being mounted on pins P, corresponding to the holes 2, and fixed to the table, the surface of which is shown at T, that forms part of the registering machine.

Holes are then drilled or otherwise formed through records, layout and transparent sheets either using the holes 10 and 11 in the bush plate 9 as a guide so that the holes appear upon the margin of the records, or in any other position on the records according to the space available. These holes are also shown adjacent to the area E on FIG. 5. The whole sequence is then repeated for each set of records indicated at F, G and H at FIG. 1 and FIG. 5.

It will be seen that if the drill is maintained in a position at 90° to the plane of the table then four exactly similar transparent sheets will be produced and four exactly similar groups of color records so far as the disposition of the locating holes is concerned.

Figure 5:
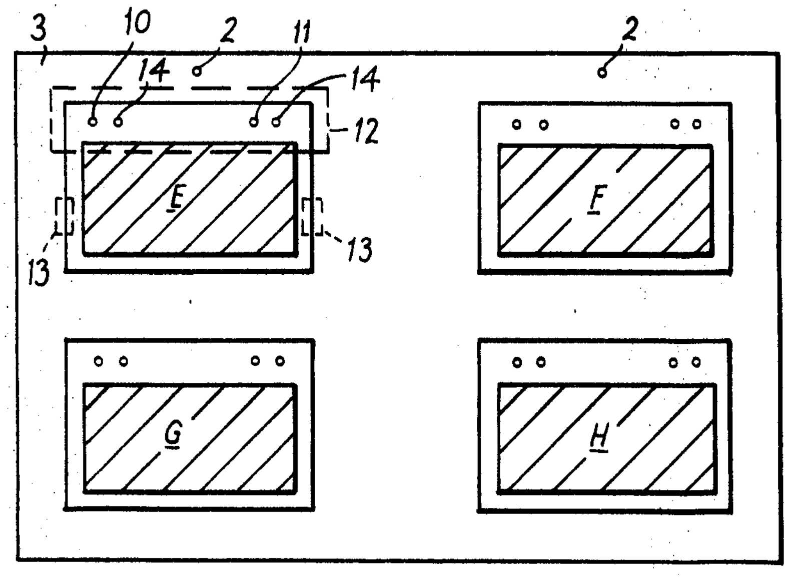
FIG. 5 shows a completed flat, a transparent or opaque sheet with one group of records mounted in position, FIG. 6 (Sheet 1) shows one form of drill.

The set of records is now fixed, one to each transparent sheet, as follows, referring to FIG. 5.

A suitable pin, such as a flat-headed loose pin is placed in the holes 10 and 11 in the first transparent sheet from the rear and the color record laid thereover. A bush plate 12 (shown dotted) similar to the bush plate 9 may be laid on top of the record so that the pins in holes 10 and 11 will be at 90° to the plane of the table and the record is affixed to this transparent sheet by adhesive or adhesive tape as indicated at 13, or in any other fashion found desirable. The pins are then removed and the operation is repeated for the remaining records at F, G and H in the same color group so as to complete the first flat and this is repeated for the subsequent color groups.

When the method is used for the registration of printing plates, e.g. lithographic plates, the transparent sheets 3 may be replaced by opaque sheets, e.g. of copper. These plates will then register on the same pins.

When layout repeats are to be made, e.g. in the printing of periodicals, pictures appearing in the same relative positions from issue to issue, the layout need be drawn up only for the first issue practicing the invention, and larger numbers of predrilled transparent sheets 3 may be kept in stock ready to receive future color records. A much larger bush plate may also be provided which has holes provided for each set of records so that the entire sheet of film 3 may be drilled in a prearranged pattern to give a standard pattern without the use of a layout.

The invention may also be used in the well-known "step-and-repeat" process, where a single picture or symbol or group thereof is laid down a number of times over a printing area to save printing time. In this case, each picture can be positioned by stepping the record along in rows and columns by a simple measurement.

The sheet materials forming the carriers 3 must be dimensionally stable. Where these are transparent, we have found that a convenient and suitable material is that known under the Registered Trade Mark ASTRAFOIL, but many such materials are well-known in the art and are readily available. They could be made from glass with suitable formation of the drill.

Another advantage accruing from the invention is that, if a mistake occurs in one component or a set thereof, it or they may be remade and easily brought into register with the other and/or with the others of a set merely by using the register pins provided.

Figure 6:
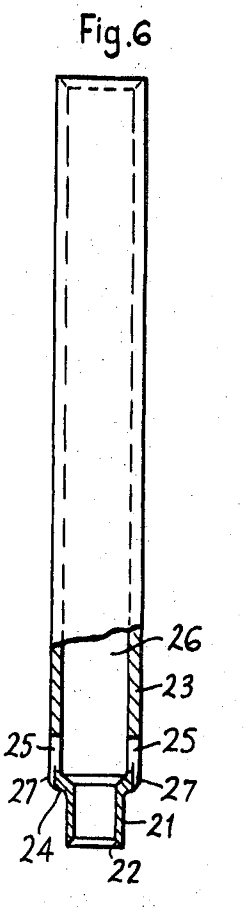

FIG. 6 shows one form of drill for drilling the register holes. The drill is of tubular form and has an annular tip 21 provided with a cutting edge 22; the tip merging with the wider shank portion 23 by means of the shoulder 24. Air holes 25 are provided in the wall of the shank and suction is applied to the bore 26 of the shank to draw up the circular pieces of material cut out by the drill. The drill may be held by a bush or collar around the shank adjacent the shoulder, and in order to allow air to flow through the holes even if they are covered by the bush plate channels 27 may extend from the holes to the edge of the shoulder.

Figure 7:
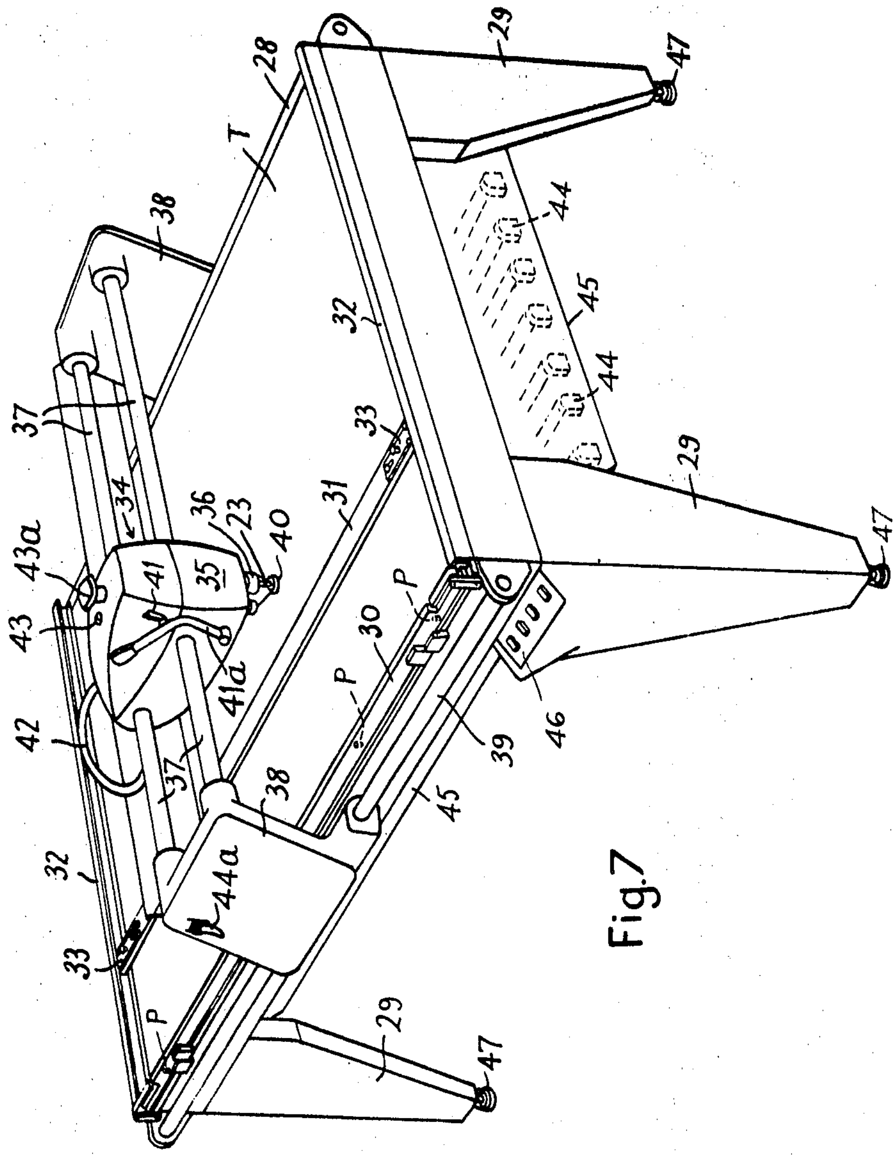
FIG. 7 shows a perspective view of one form of registering machine.

FIG. 7 shows a convenient form of registering machine for practicing the invention. It comprises a rectangular framework 28 supported on four legs 29. The table surface T on which the layouts and records are positioned may be conveniently formed from a translucent plastics material such as polyvinyl chloride or polyethylene. The location pins P are received in suitable holes formed in one edge of the machine, at least two such pins being provided, one of which locates in a round hole and the other of which locates in a slot to allow for a sideways adjustment. Such arrangements are in themselves well-known. Along that edge and outside the line of pins P is provided a first clamping bar 30 to hold the sheets of materials (not shown in this FIG.), and this clamping bar may be of conventional construction, hinged along one edge and spring-loaded to engage over the edges of the sheets. In the drawing a second clamping bar 31 may be provided to clamp the opposite edge of the sheets, being positionable in slides 32 formed along the side edges of the machine. The bar 31 is clamped in position by screw clamps of conventional kind, schematically shown at 33.

For simultaneous drilling of the various register holes, a drilling apparatus 34 is mounted above the table T. It comprises a drilling head 35 with a chuck 36 to take a drill of the kind shown in FIG. 6 and whose shank portion 23 is visible on the drawing. The head 35 is mounted to slide along two slide bars 37 supported by brackets or end supports 38 themselves mounted to slide on slide bars, one of which is shown at 39. Thus the head has two degrees of movement whereby the drill can be accurately positioned at any desired location over the area of the table. A guide 40 having an aperture for the passage of the drill may be brought down over the area of the work in the manner of a sewing machine presser foot by a control handle 41. The vertical movements of the drill are controlled by another handle **41*a*. Such drilling apparatus is conventional and forms no part per se of the present invention: thus it is not necessary to illustrate it in greater detail. The drilling apparatus is preferably powered by electricity, the supply cable being shown at 42. For inspection and maintenance the drilling head comprises a two-part casing secured together by a screw 43. A screw 43*a* is provided to clamp the drilling head to one of the slide bars 37** as will be apparent to any person skilled in the art, to lock the head in a first dimension.

In order to lock the drilling head 35 in a second dimension, the end supports 38 are clamped to the slide bars 39 by means of lever clamps **44*a***, one on each such support. These lever clamps may take any form well-known in the mechanical arts, and may be linked together at the two ends so that operation of either one lever clamp will act on both of them.

Reference has been made throughout this specific description to color separation components but the invention may be practiced with other kinds of components to produce a final montage. Thus the individual components could be of different graphic kinds e.g. outline drawing, shading, hatching, stippling, half-tone, or continuous-tone washes, and some of these components may be colored, depending on the effect desired, to produce a montage of one color or various colors.

If colored components are used, they may bear color in areas different from those in other components.

For back illumination of the translucent table surface T, a number of strip light sources, shown dotted at 44, is located beneath the said surface, mounted on a support plate 45. This plate may be fixed or removably secured in slides provided on the legs 29, whereby a replacement lighting unit may be installed, or alternatively, a unit of much greater power whereby the machine may be used to effect printing-down of the printing plates so that the same machine may also perform the function of a printing machine with maximum conservation of floor space e.g. in a small printing works. If desired such a high-powered lighting unit, with suitable diffusing screens, may be permanently installed beneath the plate 43 shown, which latter could simply be withdrawn when printing is to be carried out. Suitable power sockets may be provided in the frame or legs to enable the removable unit to be uncoupled from the mains supply. The electric circuits of the machine may be controlled from a switch bank conveniently located on one leg 29 at 46.

To enable the table surface to be adjusted for horizontality, or to accommodate the machine to uneven flooring the legs 29, or some of them, may be provided with screwed height adjusters 47 of any desired kind.

We claim:

1. In a graphic or like reproduction process, for effecting the registration of at least one set of color components with respect to at least one carrier sheet, the improvement which comprises initially registering the components of said at least one set with respect to said at least one carrier sheet on a supporting surface, drilling at least two spaced registration holes through said at least one set of components and said at least one carrier sheet while in the same relative positions on said surface, and positioning the at least one set and the at least one carrier sheet in register one with the other by locating said register holes over register pins.

2. A method as claimed in claim 1 in which each registration hole through said at least one set is drilled at the same time as the corresponding hole through said at least one carrier sheet.

3. A method according to claim 2 wherein the at least one set of color separation or other components is positioned on the at least one carrier sheet before formation of the registration holes.

4. A method according to claim 1 wherein the at least two spaced registration holes are formed with the assistance of an appropriately apertured jig.

5. A method as claimed in claim 1 utilizing a plurality of color sets and carrier sheets, in which the carrier sheets are provided with registering perforations near at least one edge and are retained in alignment with each other by pins projecting through said perforations while said registration holes are being drilled.

6. A method as claimed in claim 1 in which the cuttings resulting from said drilling are removed through the drill itself.

7. Apparatus for registering at least one set of color components with respect to at least one carrier sheet in a graphic reproduction process, said apparatus comprising a support having a translucent surface to receive said at least one set and said at least one carrier sheet, lighting means positioned beneath said surface to provide illumination thereof, holding means for securing said set and sheet in relation to said surface, and a rotary drilling machine for drilling holes in said set and sheet mounted to move with 2° of movement above said surface, said drilling machine comprising a hollow drill provided with a tip having a cutting edge, and at least one air hole spaced from said cutting edge, together with suction means connected to draw air and cuttings through said tip, away from said cutting edge, and out through said at least one air hole.

8. Apparatus for registering at least one set of color components with respect to at least one carrier sheet in a graphic reproduction process, said apparatus comprising a support having a translucent surface to receive said at least one set and said at least one carrier sheet, lighting means positioned beneath said surface to provide illumination thereof, holding means for securing said set and sheet in relation to said surface, and a rotary drilling machine for drilling holes in said set and sheet mounted to move with 2° of movement above said surface, said drilling machine comprising a hollow drill provided with a tip having a cutting edge and said translucent surface being made of a material softer than said drill.

9. Apparatus as claimed in claim 8 in which said hollow drill is provided with at least one air hole spaced from said cutting edge, together with suction means connected to draw air and cuttings through said tip, away from said cutting edge, and out through said at least one air hole.

10. Apparatus as claimed in claim 8 in which said translucent surface is made of a synthetic plastic material.